(12) United States Patent
Carey et al.

(10) Patent No.: US 9,280,540 B2
(45) Date of Patent: Mar. 8, 2016

(54) CONTENT-DRIVEN DOWNLOAD SPEED

(71) Applicant: Verizon Patent and Licensing Inc., Basking Ridge, NJ (US)

(72) Inventors: Christopher Thomas Carey, Manhattan Beach, CA (US); Michael A. Weintraub, Medfield, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 286 days.

(21) Appl. No.: 13/632,250

(22) Filed: Oct. 1, 2012

(65) Prior Publication Data

US 2014/0095731 A1    Apr. 3, 2014

(51) Int. Cl.
G06F 15/16 (2006.01)
G06F 17/30 (2006.01)
H04N 21/2187 (2011.01)
H04N 21/2343 (2011.01)
H04N 21/442 (2011.01)

(52) U.S. Cl.
CPC ............ *G06F 17/30* (2013.01); *H04N 21/2187* (2013.01); *H04N 21/23439* (2013.01); *H04N 21/44209* (2013.01)

(58) Field of Classification Search
CPC ............... G06F 17/30; H04N 21/2187; H04N 21/23439; H04N 21/44209
USPC .......................................................... 709/233
See application file for complete search history.

(56) References Cited

U.S. PATENT DOCUMENTS

| 8,179,981 | B2 | 5/2012 | Chen et al. | |
| 2002/0164152 | A1* | 11/2002 | Kato | G11B 27/034 386/248 |
| 2008/0195761 | A1* | 8/2008 | Jabri | H04L 65/605 709/250 |
| 2012/0004960 | A1* | 1/2012 | Ma | G06Q 30/0241 705/14.4 |
| 2012/0005368 | A1* | 1/2012 | Knittle | H04N 21/23439 709/235 |
| 2013/0179590 | A1* | 7/2013 | McCarthy | H04N 21/8456 709/231 |

* cited by examiner

*Primary Examiner* — Jude Jean Gilles
*Assistant Examiner* — Jaren M Means

(57) ABSTRACT

A network device may receive a request for content; determine a bandwidth of a communication link between a client device and the network device; select a download speed based on the determined bandwidth; and choose, for transmission from the network device to the client device, a content segment among a plurality of content segments in a directory associated with the download speed based on an amount of the content already downloaded. The plurality of content segments may include variable bit rate content segments. The network device may stream the chosen content segment to the client device.

20 Claims, 10 Drawing Sheets

CONTENT-DRIVEN DOWNLOAD SPEED

BACKGROUND

Many of today's entertainment or communication-related electronic devices rely on streaming digital data or content. For example, a set-top box may receive broadcast television programs and/or video-on-demand (VOD) that is streamed from a content provider. A personal computer may receive a stream of a video clip over the Internet. A smart phone may receive streaming audio data over a real-time transport protocol (RTP) link/channel that is established over an Internet Protocol (IP) session.

DETAILED DESCRIPTION

The following detailed description refers to the accompanying drawings. The same reference numbers in different drawings may identify the same or similar elements.

As used herein, the term "content" may refer to audio, video, and/or multimedia content (e.g., a movie, a three-dimensional (3D) movie, a show, a television program, a video stream, an audio stream, an Internet radio program, a Podcast, a broadcast of a live event (e.g., sporting event, concert, etc.), etc.). As used herein, the terms "directory" and "folder" may refer to a file that lists or contains other files. Each of the other files may include a directory.

As described below, a system may adjust the download speed of a data stream from a server device to a client device based on the content of the data stream. In one implementation, prior to streaming the data, the system may generate to-be-streamed files (content segments) by determining how much resolution (e.g., display resolution, sound resolution, etc.) is needed, or how time aliasing can be tolerated, to effectively play each of different segments of the content. The determination may be based on, for example, the velocity of motion in a set of frames and may be expressed through metadata (e.g., a map) that may be shared upfront or just prior to when a particular segment is needed. In one implementation, the system may generate the content segments for each of different potential transmission rates. During an actual transmission, depending on the instantaneous or current bandwidth of the channel, the system may select and transmit one of the files of the different transmission rates.

In another implementation, prior to streaming the data, the system may generate a content map that indicates the resolution/aliasing requirements and the download speed required to effectively play each of different segments of the content at the client device. When the system streams the content from the server device to the client device, the server device may adjust the download speed of the stream based on the content map, client bandwidth request/suggestions, and available communication bandwidth.

Figure 1:
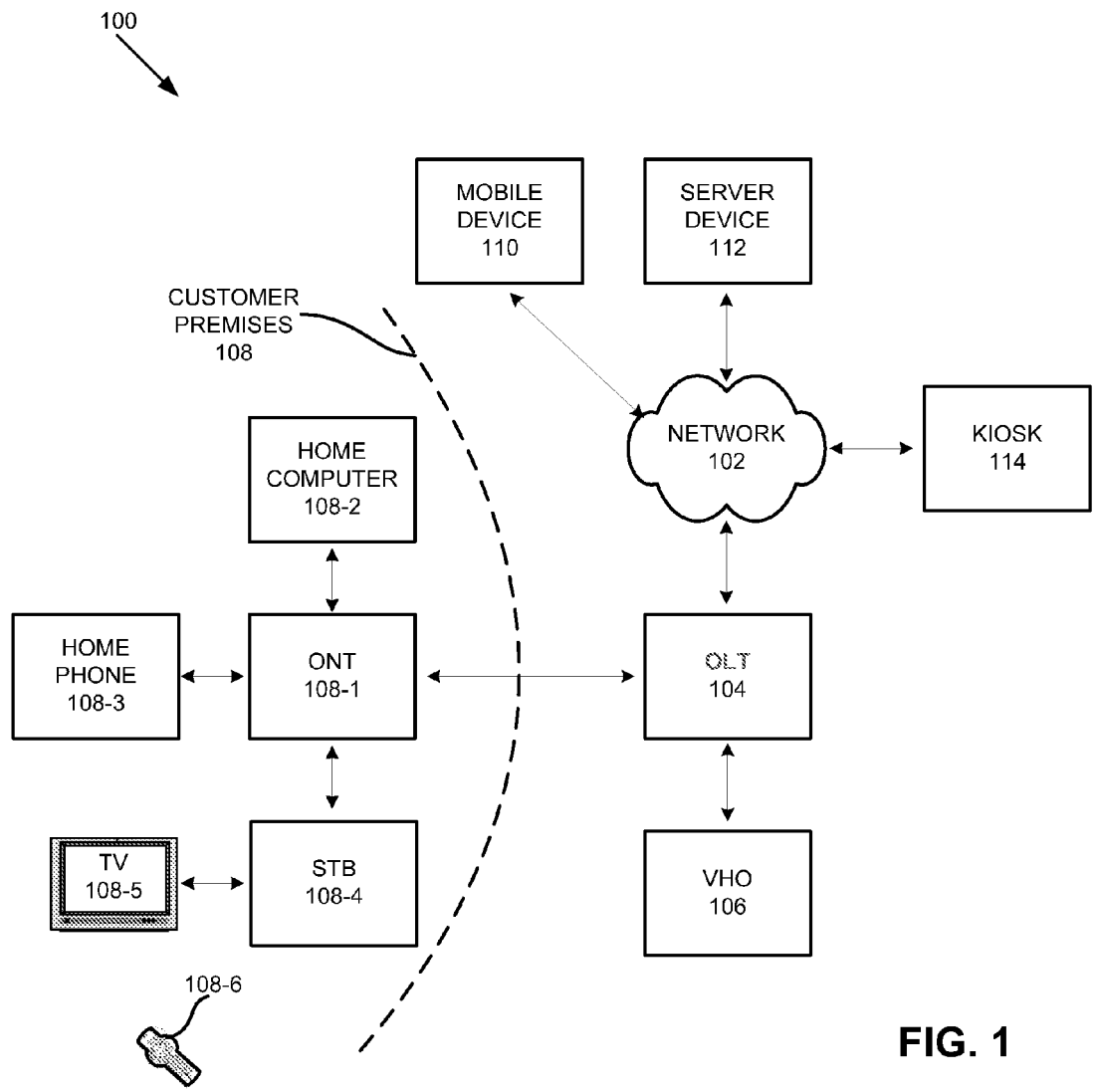
FIG. 1 illustrates an exemplary network in which a content-driven download speed system may be implemented.

FIG. 1 is a diagram of an exemplary network 100 in which a content-driven adaptive bit rate system may be implemented. Network 100 may include a network 102, which may include an optical line terminal (OLT) 104 and a video hub office (VHO) 106, customer premises 108, a mobile device 110, a server device 112, and a kiosk 114. Customer premises 108 (e.g., the customer's home) may include an optical network terminal (ONT) 108-1, a home computer 108-2, a home phone 108-3, a set-top box (STB) 108-4, a TV 108-5, and a remote control 108-6. Devices in customer premises 108, such as home computer 108-2, home phone 108-3, STB 108-4, TV 108-5, and remote control 108-6 may each be a "user device" or a "client device."

Network 102 may include one or more packet switched networks, such as an Internet protocol (IP) based network, serving a multiplicity of areas—a local area network (LAN), a wide area network (WAN), or a personal area network (PAN)—or be private, e.g., an intranet or public, e.g., the Internet, a cellular network, a wired network such as fiber-optic, coaxial, or twisted pair-based networks, or another type of network that is capable of transmitting data. Network 102 may also include a circuit-switched network, such as a public-switched telephone network (PSTN) for providing telephone services for traditional telephones. Network 102 may allow devices at customer premises 108 (e.g., STB 108-4) to connect to other devices also attached to network 102.

OLT 104 may terminate optical fibers, at a service provider end, between ONT 108's and the service provider network. OLT 104 may convert optical/electrical signals to/from electrical/optical signals, provide upstream signal processing, and multiplex content from different sources for downstream delivery to customer premises 108. VHO 106 may provide on-demand content or may serve and manage interactive content. VHO 106 and devices in network 100 may form part of a high-speed fiber optic network (e.g., FiOS™).

ONT 108-1 may receive data, e.g., on a fiber optic cable, and may transfer the data to the appropriate device in customer premises 108, such as computer 108-2 or STB 108-4. Likewise, ONT 108-1 may receive data from any device in customer premises 108 and may transmit the data to other devices in network 100, e.g., through a fiber optic cable. ONT 108-1 may provide customer premises 108 with Internet access, television access, and/or telephone service, for example.

Computer 108-2 may include a laptop, a desktop, a tablet computer, a mobile telephone, a personal digital assistant (PDA), a gaming console, or another portable communication device. Computer 108-2 may include a microphone for capturing audio and/or a camera for capturing images or video. Computer 108-2 may also include a display for showing images or video or a speaker for playing audio. Home phone 108-3 may include a plain-old-telephone service (POTS) device, a wireless telephone, a soft phone (e.g., Voice-over-Internet Protocol (IP) (VoIP) phone), etc.

STB 108-4 may receive content and output the content to TV 108-5 for display. STB 108-4 may include a component (e.g., a cable card or a software application) that plugs into a host device (e.g., a personal computer, TV 108-5, a stereo system, etc.) that allows the host device to display content. STB 108-4 may also be implemented as a home theater personal computer (HTPC), an optical disk player (e.g., digital video disk (DVD) or Blu-Ray™ disc player), a cable card, etc. STB 108-4 may receive commands from other devices in network 100, such as remote control 108-6. In one embodiment, STB 108-4 may include a microphone and/or a camera.

TV 108-5 may include speakers as well as a display. TV 108-5 may play content, for example, received from STB 108-4. While some embodiments described below may interact with TV 108-5, other embodiments may interact with any device (e.g., computer 108-2 or mobile phone 102-2).

Remote control 108-6 may issue wired or wireless commands for controlling other electronic devices, such as TV 108-5 or STB 108-4. Remote control 108-6, in conjunction with STB 108-4, may allow a user to interact with an application running on STB 108-4. Other types of devices (e.g., a keyboard, a mouse, a mobile phone, etc.) may be used instead of remote control 108-6, or may be included in remote control 108-6.

Mobile device 110 may include a radiotelephone, a personal communications system (PCS) terminal, a personal digital assistant (PDA), a laptop, a tablet computer, or another portable communication device. Mobile device 110 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 110 may be associated with a phone number. Like the devices in customer premises 108, mobile device 110 may also be considered a "user device" or "client device." Mobile device 110 may be located outside or inside customer premises 108.

Server device 112 may include a network device for streaming content to home computer 108-2 (via network 102) or mobile device 110. Server device 112 may be located in a content provider network different from that of VSO 104 and VHO 106, for example.

Kiosk 114 may include one or more computers for hosting programs, such as a web browser, a database, or other applications. Kiosk 114 may include a display, a keyboard, a microphone, and a speaker. Kiosk 114 may include a handset with an integrated speaker and microphone. Kiosk 114 may be used, for example, as an automatic teller machine (ATM), a ticket machine, a calling card charging station, etc. Like the devices in customer premises 108, kiosk 114 may also be considered a "user device" or a "client device."

In FIG. 1, a server device, such as server devices 112, a device in VSO 104, or a device in VHO 106 or a server in a data center off the Internet may stream content to user devices or client devices, such as, for example, home computer 108-2, STB 108-4, mobile device 110, or kiosk 114.

In FIG. 1, the exemplary configuration of devices in network 100 is illustrated for simplicity. Network 100 may include more devices, fewer devices, or a different configuration of devices than illustrated in FIG. 1. For example, network 100 may include thousands or millions of customer premises.

In some embodiments, the functions performed by two or more devices may be performed by any one device. Likewise, in some embodiments, the functions performed by any one device may be performed by multiple devices. Furthermore, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
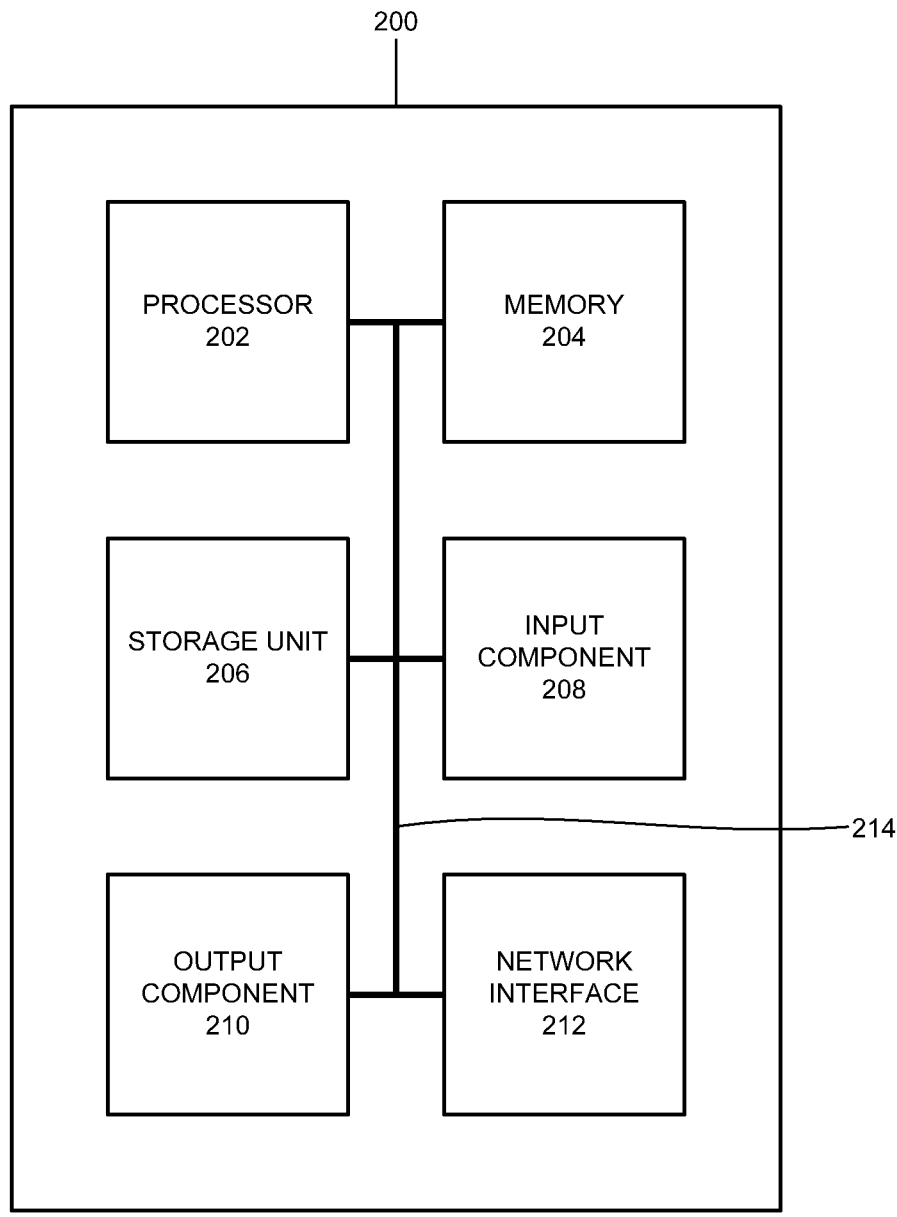
FIG. 2 is a block diagram of exemplary components of a network device in the network of FIG. 1.

FIG. 2 is a block diagram of an exemplary network device 200, which may correspond to one or more of devices in VSO 104 and/or VHO 106, devices 108-1 through 108-6, mobile device 110, server device 112, or kiosk 114. As shown, network device 200 may include a processor 202, memory 204, storage unit 206, input component 208, output component 210, network interface 212, and communication path 214. In different implementations, network device 200 may include additional, fewer, different, or a different arrangement of components than the ones illustrated in FIG. 2. For example, network device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling network device 200. Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, and/or flash memory, as well as other types of storage devices (e.g., a hard disk drive) for storing data and/or machine-readable instructions (e.g., a program, script, etc.).

Input component 208 and output component 210 may provide input and output from/to a user to/from network device 200. Input and output components 208 and 210 may include a display screen, a keyboard, a mouse, a speaker, a microphone, a camera, a DVD reader, Universal Serial Bus (USB) lines, and/or other types of components for converting physical events or phenomena to and/or from signals that may be input to or output from network device 200.

Network interface 212 may include a transceiver (e.g., a transmitter and a receiver) for device 200 to communicate with other devices and/or systems. For example, via network interface 212, network device 200 may communicate over a network, such as the Internet, an intranet, a terrestrial wireless network (e.g., a WLAN, WiFi, WiMax, etc.), a satellite-based network, an optical network, etc. Network interface 212 may include a modem, an Ethernet interface to a LAN, and/or an interface/connection for connecting device 200 to other devices (e.g., a Bluetooth interface).

Communication path 214 may provide an interface through which components of device 200 can communicate with one another.

Network device 200 may perform the operations described herein in response to processor 202 executing software instructions stored in a non-transient computer-readable medium, such as memory 204. A computer-readable medium may include a physical or logical memory device. The software instructions may be read into memory 204 from another computer-readable medium or from another device via network interface 212. The software instructions stored in memory 204 may cause processor 202 to perform processes that are described herein.

Figure 3:
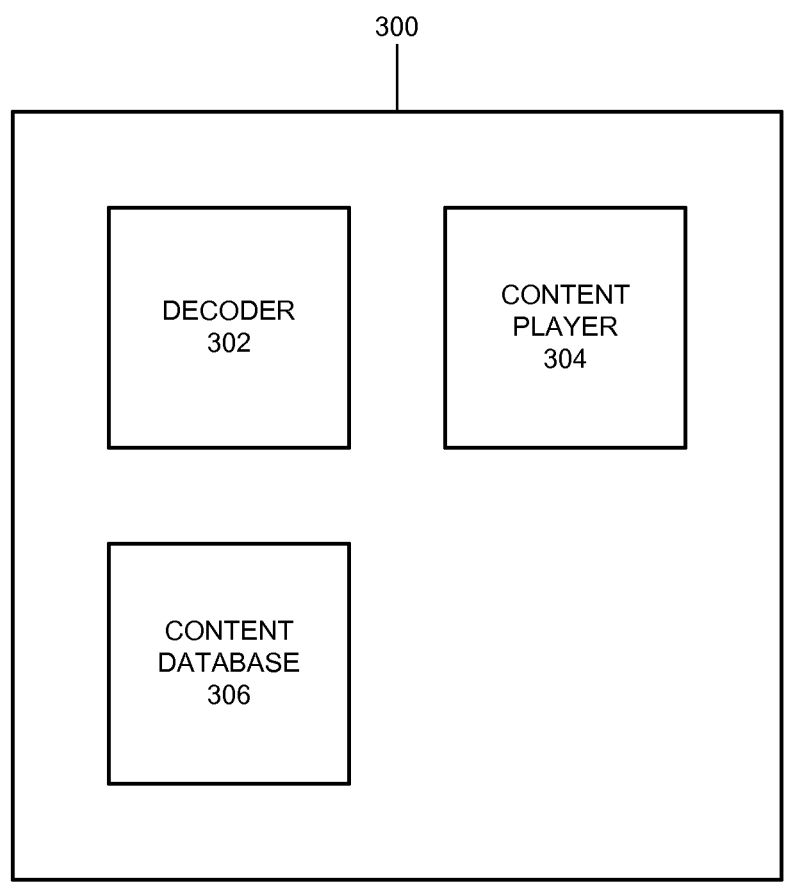
FIG. 3 is a block diagram of exemplary functional components of a client device in the network of FIG. 1 according to one implementation.

FIG. 3 is a block diagram of exemplary functional components of a client device 300 in network 100 according to one implementation. As noted above, client device 300 may include home computer 108-2, home phone 108-3, STB 108-4, mobile device 110 or kiosk 114. As shown in FIG. 3, client device 300 may include a decoder 302, a content player 304, and a content database 306. Although client device 300 may include other functional components (e.g., an operating system, an application, an email client, etc.), for simplicity, they are not illustrated in FIG. 3. Furthermore, depending on the implementation, client device 300 may include additional, fewer, different, or a different arrangement of components than those illustrated in FIG. 3. The components of FIG. 3 may be implemented in memory 204 when instructions are loaded, for execution by processor 202, from storage unit 206 or from other device(s).

Decoder 302 may decode a content stream received from a server device. Content player 304 may play the content of an incoming stream. In addition, content player 304 may use information pertaining to the content (e.g., electronic program guide, etc.) to provide a user interface, generate menus, control branching (e.g., navigate through a menu tree), and/or provide for trick plays (e.g., fast forward, rewind, pause, etc. Content player 304 may direct the output of decoder 302 to another component (e.g., a display screen or a storage unit 206) or a device, such as television 108-2 or a peripheral device).

Content database 306 may include stored contents (e.g., recorded program, movie, etc.). Content player 304 may access content database 306 to replay content.

Figure 4:
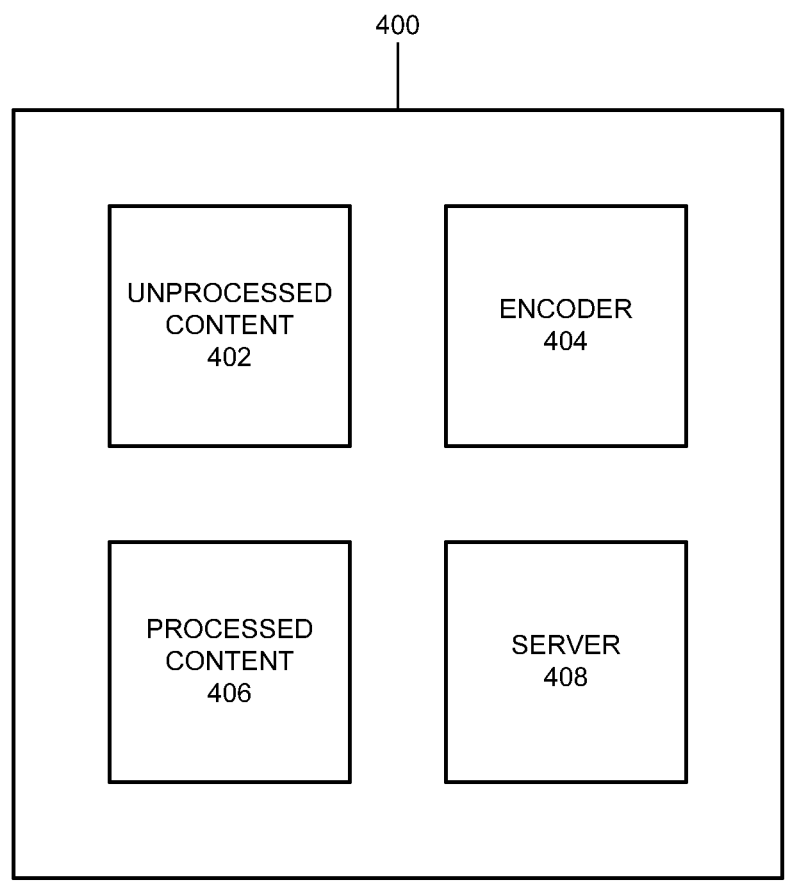
FIG. 4 is a block diagram of exemplary functional components of a server device in the network of FIG. 1 according to one implementation.

FIG. 4 is a block diagram of exemplary functional components of a server device 400 in network 100 according to one implementation. Server device 400 may include server device 112 or one or more devices in VSO 104 and/or VHO 106. As shown in FIG. 4, server device 400 may include unprocessed content 402, encoder 404, processed content 406, and server 408. Although server device 400 may include other functional components (e.g., an operating system, an application, etc.), for simplicity, they are not illustrated in FIG. 4.

In addition, depending on the implementation, server device 400 may include additional, fewer, different, or a different arrangement of components than those illustrated in FIG. 4. For example, in one implementation, unprocessed content 402 may be stored on another device and may not be included in server device 400. The components of FIG. 4 may be implemented in memory 204 when instructions are loaded, for execution by processor 202, from storage unit 206 or from other device(s).

Unprocessed content 402 may include content (e.g., a scheduled program, a movie, a song, etc.) that may be streamed to client device 300. Unprocessed content 402 may include content that is yet to be encoded for transmission. Unprocessed content 402 may be implemented as a database, a directory, a file (e.g., a tar file or another type of file), etc.

Encoder 404 may receive an input content stream (e.g., from a live stream, from files in unprocessed content 402, etc.) and generate encoded content as segments (i.e., a sequence of files), for each of different, potential download speeds.

In one implementation, for a given download speed, for each of the segments, encoder 404 determines the quality of the segment (e.g., what spatial and/or temporal resolution is required to effectively play the segment without losing quality), and sets the encoding bit rate for the segment in accordance with the quality. Consequently, for each of the potential download speeds, encoder 404 generates a stream of content-driven variable bit rate files, as described below in greater detail.

In another implementation, encoder 404 generates, for each of potential download speeds, segments encoded at a constant bit rate. In addition, for each of the potential download speeds, encoder 404 generates a content map that indicates the qualities (e.g., temporal resolution, spatial resolutions (e.g., a display resolution), etc.) and the download speeds required to effectively play the segments. The encoded segments are stored as processed content 406, which may be implemented as a database, a directory, a file (e.g., a tar file or another type of file), etc.

In determining the quality of a segment required to effectively play the segment at client device 300, encoder 404 may determine the amount of detail (e.g., audio detail, visual detail, etc.) and how much "action" (e.g., changes) occurs in the segment. Segments with a lot of action or changes (e.g., differences between frames in a video, many changing details, etc.) may require the segment to be encoded at a higher temporal and/or spatial resolution than other segments that are more static. For such segments, encoder 404 may encode the segments at higher bit rates, or alternatively, indicate in the content map, such bit rates for the segments.

Figure 5:
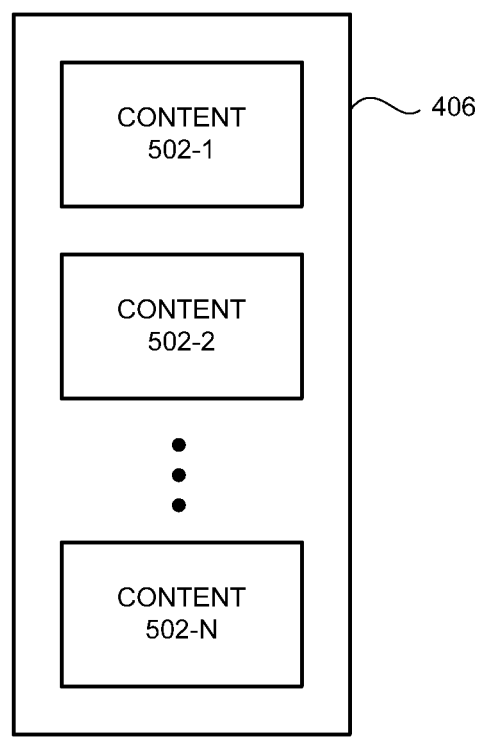
FIG. 5 is a block diagram of exemplary components of the processed content of FIG. 4 according to one implementation.

Processed content 406 may include, for given content, outputs of encoder 404. FIG. 5 is a block diagram of exemplary components of processed content 406 according to one implementation. As shown, processed content 406 may include contents 502-1 through 502-N, where N is an integer greater than 0 (collectively referred to as "contents 502" and individually as "content 502"). Each of contents 502 may be multi-bit rate. That is, content 502, for each of several possible download speeds, may include a sequence of files (e.g., "chunks") that may be streamed to client device 300.

Returning to FIG. 4, server 406 includes hardware and/or software for interacting with a client and downloading a selected content from server device 400 to client device 300. As described below in detail, server device 400 may change the download speed and/or bit rate based on available channel bandwidth and/or the qualities of transmitted segments.

Figure 6:
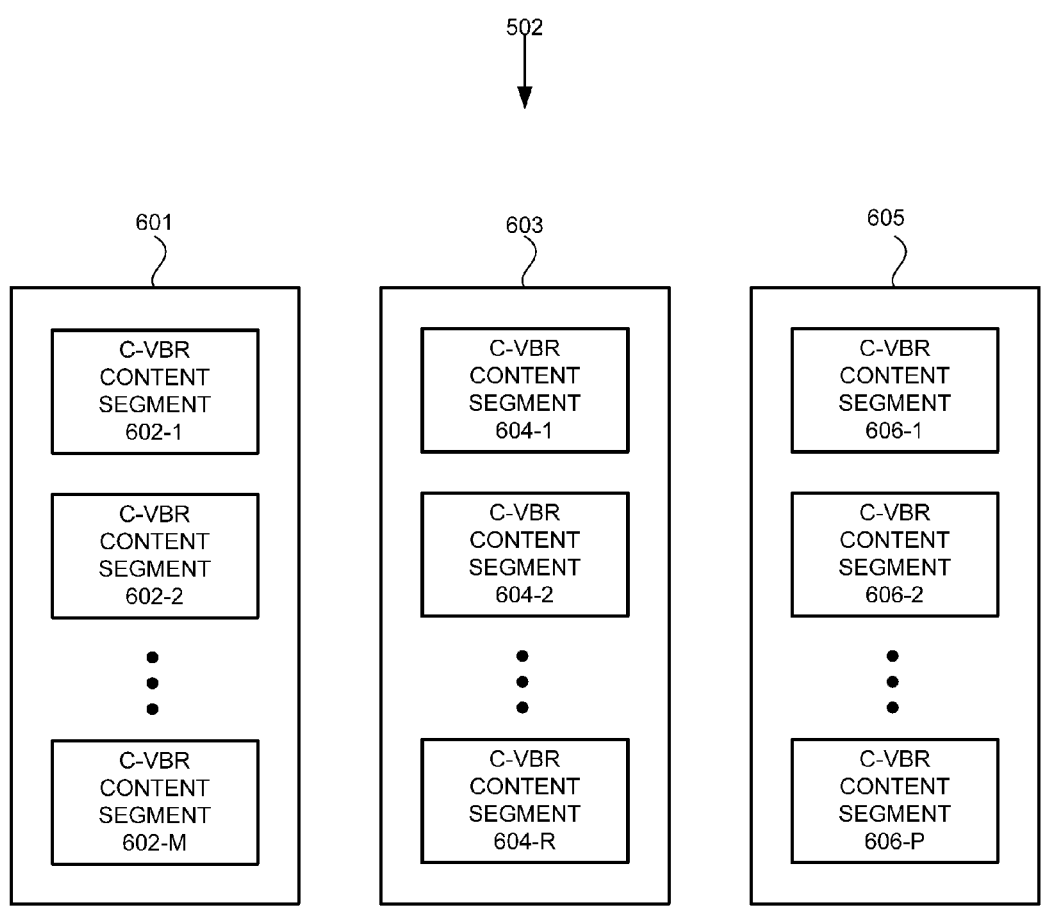
FIG. 6 is a block diagram of exemplary components of the content directory/folder of FIG. 5 according to one implementation.

FIG. 6 is a block diagram of exemplary components of content 502. As shown, content 502 may be multi-bit rate, and may include directories/folders 601, 603, and 605 for three different download speeds (e.g., 500 kilobits per second (Kbps), 1 mega bits per second (Mbps), and 3 Mbps). Depending on the implementation, content 502 may include additional, fewer, or different directories/folders that correspond to different download speeds.

Directory/folder 601 includes content-driven variable bit rate (C-VBR) encoded content segments 602-1 through 602-M (collectively referred to as "content segments 602" and individually as "content segment 602"). Each content segment 602 may have been generated by encoder 404 by applying a content-driven variable bit rate encoding scheme, as described above. Each content segment 602 may be relatively short (e.g., 1-5 seconds), although its length can vary depending on the content. As noted above, for each content segment, encoder 404 may have analyzed the segment to determine the level of temporal and spatial resolution required for client device 300 to play/present the segment to a user without significantly sacrificing quality. Depending on the analysis, each C-VBR content segment 602 may have been encoded at a bit rate that is equal to or lower than the download speed associated with directory/folder 601.

Directory/folder 603 may include C-VBR content segments 604-1 through 604-R (collectively referred to as "content segments 604" and individually as "content segment 604"), and directory/folder 605 may include C-VBR content segments 606-1 through 605-P (collectively referred to as "content segments 606" and individually as "content segment

606. Each of the content segments 604 and 606 may have been generated by applying the content-driven variable bit rate encoding scheme. In contrast to files in directory 601, however, the encoding bit rates for directory/folder 603 and 605 are capped by the download speeds associated with directory/folder 603 and 605, respectively. That is, the encoding bit rate for each C-VBR content segment 604 is equal to or less than the download speed associated with directory/folder 603, and the encoding bit rate for each VBR content segment 606 is equal to or less than the download speed associated with directory/folder 605. In other implementations, the encoding bit-rates of content segments 602, 604 and 606 may not be capped by the corresponding download speeds.

Figure 7:
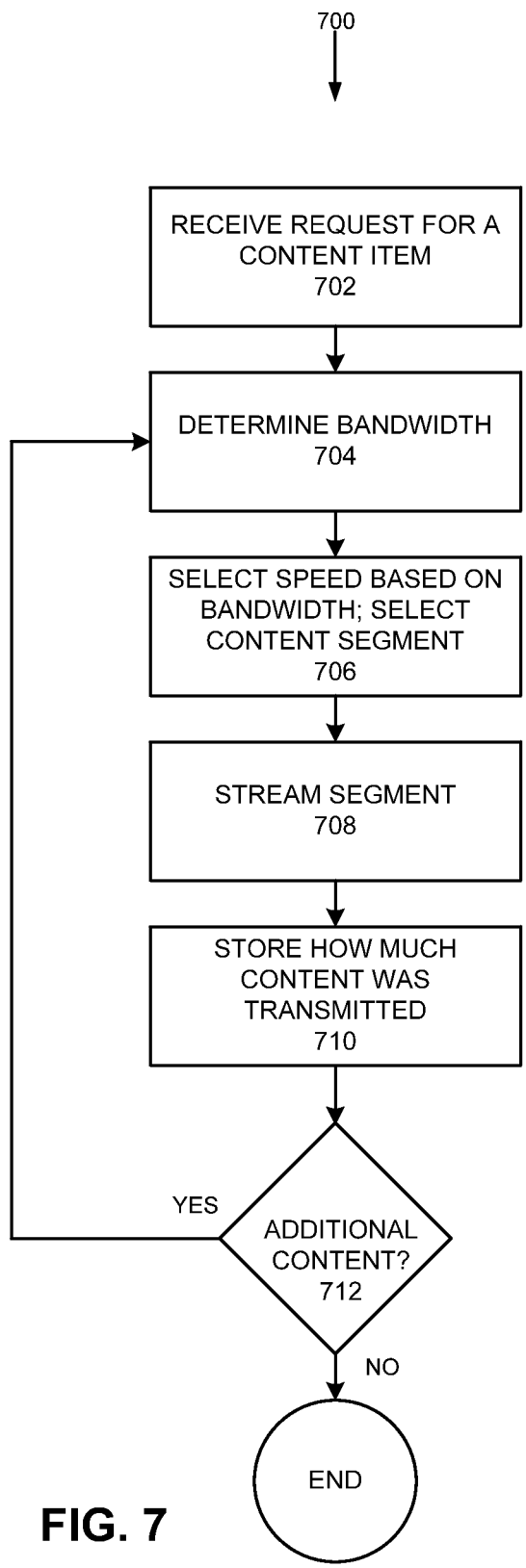
FIG. 7 is a flow diagram of an exemplary process that is associated with the server of FIG. 4 in accordance with the implementation of FIG. 6.

FIG. 7 is a flow diagram of an exemplary process 700 that is associated with server 408 in accordance with the implementation of FIG. 6. Assume content 502 in processed content 406 of server device 400 includes directories 601, 603, and 605 that correspond to available download speeds of 500 Kbps, 1 Mbps, and 3 Mbps, respectively. Furthermore, assume that directory 601 includes content segments 602 whose VBRs are equal to or less than 500 Kbps; directory 603 includes content segments 604 whose VBRs are equal to or less than 1 Mbps; and directory 605 includes content segments 606 whose VBRs are equal to or less than 3 Mbps.

As shown in FIG. 7, process 700 may include receiving a request from client device 300 for a content item (block 702). The content item may include a recording of a live event, a live stream that is being encoded by encoder 404 to produce contents of directory/folder 502, a movie, a television program, a song, etc.

Server 408 may determine available bandwidth of the communication channel between client device 300 and server device 400 for downloading the selected content item (e.g., 1 Mbps) (block 704). Furthermore, in response to the determination, server 408 may select an appropriate download speed (e.g., download speed≤available bandwidth) (block 706). For example, assume that server 408 determines that the available bandwidth is 1.2 Mbps. Accordingly, server 408 may select the download speed of 1 Mbps.

Server 408 may select a C-VBR content segment based on the bandwidth and how much of the content item has been transmitted to client device 300 (block 706). Continuing with the previous example, assume that server 408 previously sent C-VBR content segment 602-4 (not shown in FIG. 6). In such an instance, server 408 would select a C-VBR content segment, in directory/folder 603 (which corresponds to 1 Mbps) whose content follows the content in content segment 602-4. Assuming that the content in content segment 604-9 (not shown) follows that of content segment 602-4, server 408 would send content segment 604-9 to client device 300.

Server 408 may send the selected C-VBR content segment (block 708). Continuing with the preceding example, server 408 may send content segment 604-9 in directory/folder 603. In addition, server 408 may store information that indicates how much of the content was transmitted (block 708). For example, in one implementation, server 408 may store information that identifies the last C-VBR encoded content segment sent to client device 300. In a different implementation, assuming that the content is a video, server 408 may store the last frame number, of the content, that was sent to client device 300. In yet another implementation, server 408 may store a value indicative of how much content, measured in units of time, was sent. Server 408 may use the stored information at block 706, if and when process 700 loops back at to block 706 via block 712.

Server 408 may determine whether there are additional C-VBR encoded content segments to be sent to/or requested by client device 300 (block 712). If there is another C-VBR encoded content segment to be sent (block 712: yes), process 700 may return to block 704. Otherwise (block 712: no), process 700 may terminate.

Figure 8:
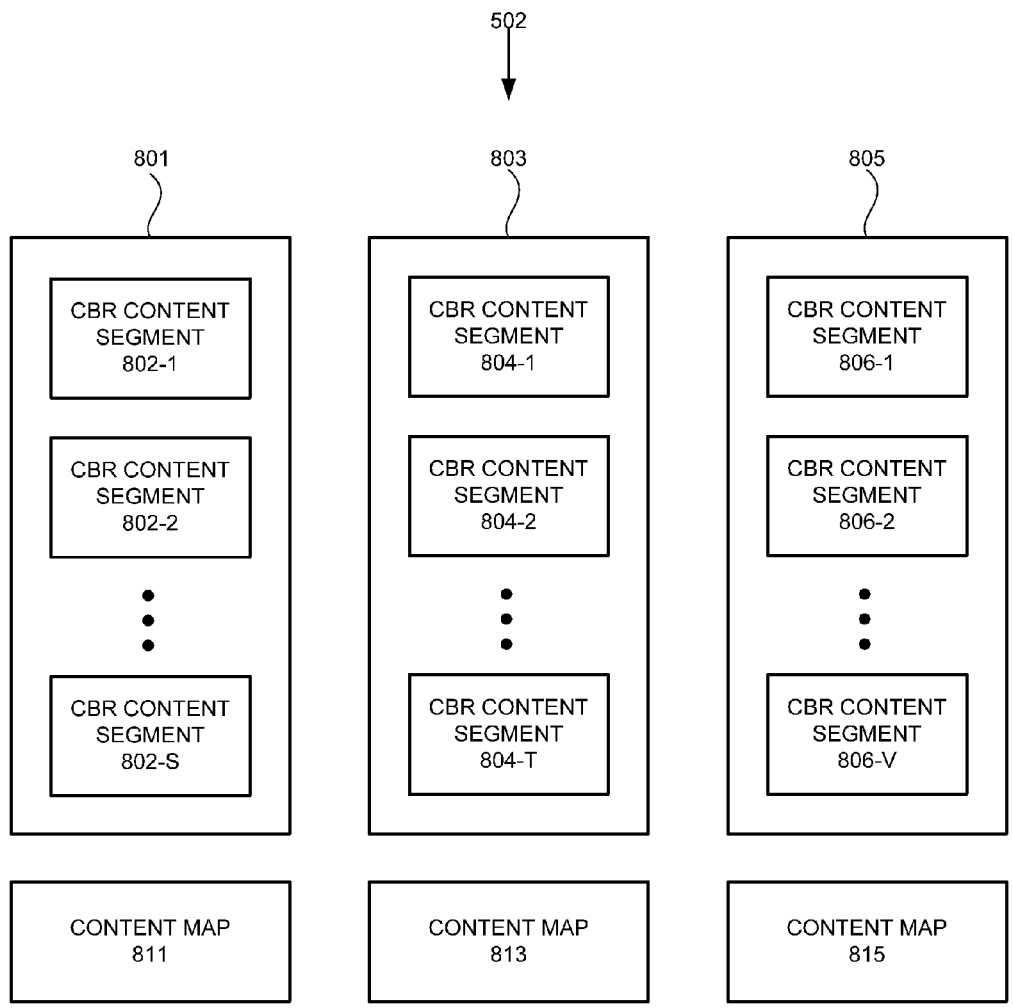
FIG. 8 is a block diagram of exemplary components of a content directory/folder of FIG. 5 according to another implementation.

FIG. 8 is a block diagram of exemplary components of a directory/folder 502 according to another implementation. In this implementation, as shown, content 502 may include directories 801, 803, and 805 for three different download speeds (e.g., 500 Kbps, 1 Mbps, and 3 Mbps). In addition, content 502 may include content maps 811, 813, and 815.

Directory/folder 801 includes constant bit rate encoded (CBR) content segments 802-1 through 802-S (collectively referred to as "content segments 802" and individually as "content-segment 802"). Each content segment 802 may have been generated by encoder 404 by applying a constant bit rate encoding scheme. The constant bit rate used for encoding corresponds to the download speed associated with directory/folder 801.

Directory/folder 803 may include CBR encoded content segments 804-1 through 804-T (collectively referred to as "content segments 804" and individually as "content segment 804"), and directory/folder 805 may include CBR encoded content segments 806-1 through 806-V (collectively referred to as "content segments 806" and individually as "content segment 806"). Each of the content segments 804 and 806 may have been generated by applying the constant bit rate encoding scheme, at different rates (e.g., 1 Mbps and 3 Mbps).

Content map 811 includes information that identifies bit rates that would have been used for each of CBR encoded content segments 802-1 through 802-S if the variable bit rate encoding scheme were used to generate corresponding content segments. Similarly, content maps 813 and 815 include information that identifies bit rates that would have been used for each of CBR encoded content segments 804-1 through 804-T and content segments 806-1 through 806-V, respectively, if the variable bit rate encoding scheme were used to generate corresponding content segments. For example, assume that content in CBR encoded content segment 804-1 would have been encoded at 0.4 Mbps if the VBR encoding were used to encode the content. Accordingly, content map 813 would indicate (e.g., as a table), for segment 804-1, it would have been encoded at 0.4 Mbps. Similarly, content map 813 would indicate, for each of content segments, a bit rate at which the content segment would have been encoded. Another component (e.g., server 408) may look up, in content map 813, at what bit rate a content segment would have been encoded. This is further described below with reference to FIG. 10.

Figure 9:
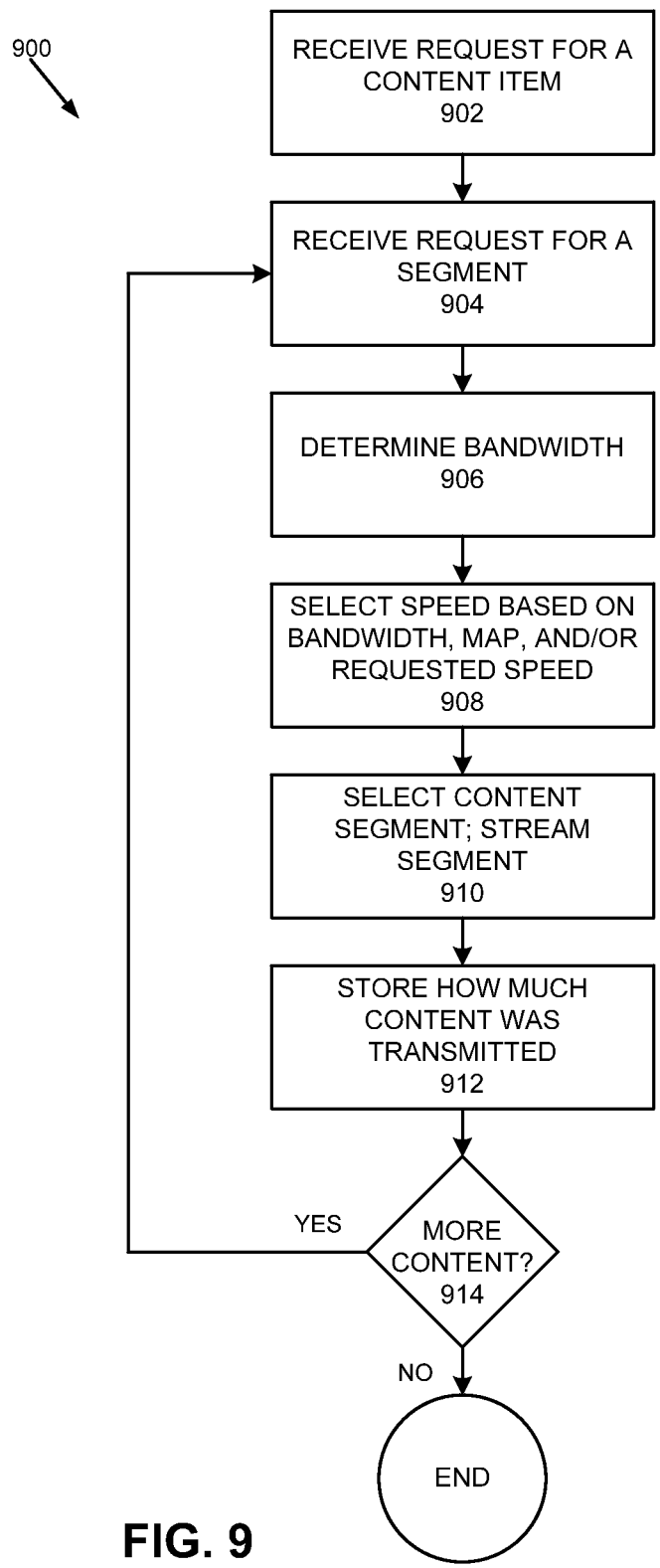
FIG. 9 is a flow diagram of an exemplary process that is associated with the server of FIG. 4 in accordance with the implementation of FIG. 8.

FIG. 9 is a flow diagram of an exemplary process 900 that is associated with server 408 in accordance with the implementation of FIG. 8. Assume content 502 in processed content 406 of server device 400 includes directories 801, 803, and 805 that correspond to available download speeds of 500 Kbps, 1 Mbps, and 2 Mbps, respectively. Furthermore, assume that directory 801 includes content segments 602 whose CBR is 500 Kbps; directory 803 includes content segments 804 whose CBR is 1 Mbps; and directory 805 includes content segments 806 whose CBR is 3 Mbps.

As shown in FIG. 9, process 900 may include receiving a request from client device 300 for a content item (block 902). The content item may include a recording of a live event, a live stream that is being encoded by encoder 404 to produce contents of directory/folder 502, a movie, a television program, a piece of music, a song, etc.

Server 408 may receive a request for a CBR encoded content segment (block 904). In one implementation, client device 300 may send server 408 a request for a content segment, along with a suggested bit rate and information that identifies the content segment. In a different implementation, server 408 may not receive such a request, and may identify and determine the content segment to send to client device 300. In some implementations, server 408 may determine a bit rate that is suited for client device 300 based on information sent from client device 300 to server 408 (e.g., processor speed, memory, graphics capability, audio capability, display screen resolution, etc.).

Server 408 may determine available bandwidth on the communication channel between client device 300 and server device 400 for downloading the selected content item (e.g., 1 Mbps) (block 906). Furthermore, server 408 may select an appropriate download speed based on the available bandwidth, the requested bit rate from client device 300 (if there is a requested bit rate), and content maps 811-815 (block 908). This is described below with respect to FIG. 10.

Server 408 may select a CBR encoded content segment based on the selected speed and how much of the content item has been transmitted to client device 300 (block 910). For example, assume that, server 408 selected the download speed of 1 Mbps. Also assume that server 408 already sent the amount of content corresponding to segments 804-1 through 804-5. In such an instance, server 408 may select CBR encoded content segment 804-6 and send CBR encoded content segment 804-6 to client device 300.

Server 408 may store information that indicates how much of the content was transmitted (block 912). For example, in one implementation, server 408 may store information that identifies the last CBR encoded content segment transmitted to client device 300. In a different implementation, assuming that the content is a video, server 408 may store the last frame number, of the content, that was sent to client device 300. In yet another implementation, server 408 may store a number indicative of how much content, measured in units of time, was sent. Server 408 may use the stored information at block 908, if/when process 900 loops back to block 908 via block 914.

Server 408 may determine whether there is more content to be sent to/or requested by client device 300 (block 914). If there is more content to be sent (block 914: yes), process 900 may return to block 904. Otherwise (block 914: no), process 900 may terminate.

Figure 10:
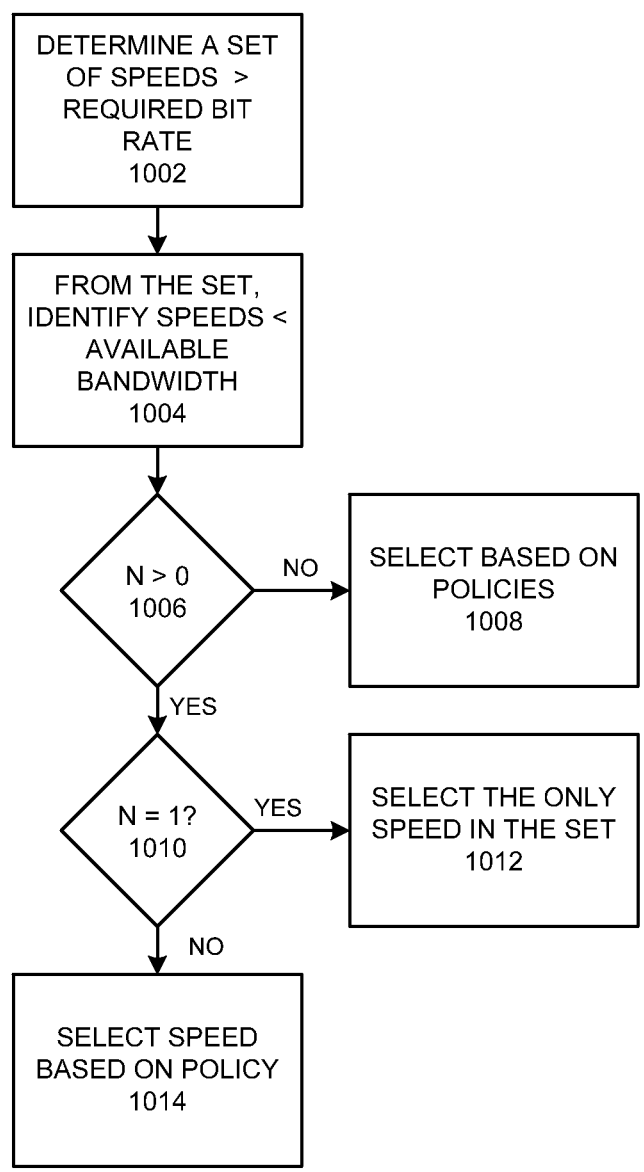
FIG. 10 is a flow diagram of an exemplary process that is associated with selecting a download speed based on available bandwidth, content maps, and/or a client-requested bit rate.

FIG. 10 is a flow diagram of an exemplary process 1000 that is associated with selecting a download speed based on available bandwidth, content maps, and/or a client-requested bit rate. Process 1000 corresponds to block 908 of process 900.

As shown, process 1000 may include, for a segment of content, determining a set of download speeds, corresponding to one or more of directories/folders 801-805, each of which is greater than the required bit rate to play the content segment. Server 408 may determine the required bit rate based on content maps 811-815, e.g., by looking up a VBR for a content segment in content maps 811-815. Once the required bit rate has been determined, server 408 may compare the required bit rate to the download speeds of the directories/folders in content 502, to determine the set.

For example, by consulting content maps 811-815, server 408 may determine that, for the next content segment to be played at client device 300 without sacrificing the quality of user experience, the minimum required bit rate is 0.4 Mbps. Server 408 may then compare the bit rate of 0.4 Mbps to the download speeds of 0.5 Mbps, 1 Mbps, and 3 Mbps that correspond to directories 801, 803, and 805. In this example, the set of speeds greater than the required bit rate includes 0.5 Mbps, 1 Mbps, and 3 Mbps.

Server 408 may identify, from the set determined at block 1002, speeds that are lower than the available bandwidth (block 1004). Continuing with the previous example, assume that the available bandwidth is 1.2 Mbps. Given the set of speeds 0.5 Mbps, 1 Mbps, and 3 Mbps, server 408 may identify 0.5 Mbps and 1 Mbps as being lower than the available bandwidth of 1.2 Mbps.

At block 1006, if the number of identified speeds are equal to zero (i.e., available bandwidth is lower than the desired download speeds) (block 1006: N=0), server 408 may select a download speed among the identified speeds based on one or more server policies (block 1008). For example, one download policy may be to transmit the content segment at the speed at which a prior content segment was transmitted. In another example, the policy may be to select the lowest speed, to least impact the network. At block 1006, if the number of identified speeds is greater than zero (block 1006), process 1000 may proceed to block 1010.

At block 1010, if the number of identified speeds is equal to one (block 1010: yes), server 408 may select the only identified speed as the download speed associated with a directory/folder from which to send the content segment (block 1012). For example, assume that the identified speed is 0.5 Mbps. In such a case, server 408 may select 0.5 Mbps as the download speed.

If the number of identified speeds is greater than one (block 1010: no), server 408 may select one of the identified speeds as the download speed based on a policy (block 1014). The policy may depend on the specific implementation.

To illustrate, assume that the required bandwidth is 0.4 Mbps, and the set of download speeds greater than the required bandwidth include 0.5 Mbps, 1 Mbps, and 3 Mbps. Assume that the available bandwidth is 1.2 Mbps. From the set, server 408 identifies download speeds of 0.5 Mbps and 1.0 Mbps as being less than 1.2 Mbps.

In this situation, server 408 may select one of the two identified download speeds (0.5 Mbps and 1.0 Mbps) based on system policies regarding bandwidth. For example, assume that server 408 follows the policy of using the minimum bandwidth, in case some of the bandwidth can be reallocated for another purpose. In this case, server 408 would select the download speed of 0.5 Mbps. In another example, server 408 may follow the policy of providing the best quality content to client device 300, and therefore, select the download speed of 1.0 Mbps.

In some implementations, client device 300 may request a bit rate (or provide information that allows server 408 to determine a well-suited bit rate for client device 300). In such an instance, server 408 may select a download speed closest to the requested bit rate. For example, assume that, for the next content segment, client device 300 requested the bit rate of 0.9 Mbps. Between 0.5 Mbps and 1.0 Mbps, server 408 may select 1.0 Mbps, since 1.0 Mbps is closer to 0.9 Mbps than 0.5 Mbps.

In processes 700, 900, and 1000, server device 400 sends content at a download speed that is most appropriate for client device 300 to effectively play the content, rather than sending the content at the maximum available speed. Segments that do not require a large bandwidth will not occupy a significant portion of the bandwidth, which allows some of the available bandwidth to be used for other purposes.

As described above, a system (e.g., client device 300, server device 400, and network 102) may adjust the download speed of a data stream from server device 400 to a client device 300 based on the content of the data stream. In one implementation, prior to streaming the data, the system may generate C-VBR content segments by determining how much spatial and temporal resolution is required to effectively play each of different portions (segments) of the content. The system may generate the C-VBR content segments for each of the potential transmission rates. During an actual transmission, depending on the instantaneous bandwidth of the communication channel, the system may select and transmit one of the VBR content segments.

In a different implementation, prior to streaming the data, the system may generate content maps that indicate spatial and temporal resolution and/or the download speed required to effectively play each of different segments of the content at client device 300. When the system streams the content from server device 400 to client device 300, server device 400 may adjust the download speed of the stream based on the content maps and available communication bandwidth.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to an exemplary process illustrated in FIGS. 7, 9, and 10, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   determining, at a network device, resolution and time aliasing requirements for each content segment of a media content based on an amount of media detail occurring in each frame of a set of frames in the content segment and an amount of change occurring in the media detail from one frame to another;
   applying, by the network device and based on the resolution and time aliasing requirements, a variable bit rate encoding scheme to the media content at a number of variable bit rates to generate sets of data streams comprised of variable bit rate encoded content segments;
   storing, by the network device, each data stream set in a media directory corresponding to a potential download speed from a plurality of different potential download speeds;
   receiving, at the network device, a request for a transmission of the media content to a client device, wherein the request indicates client device characteristics associated with the client device;
   determining, by the network device, a bandwidth of a communication link between the client device and the network device;
   identifying, by the network device, two or more download speeds, from the different potential download speeds, which are less than the determined bandwidth;
   determining, by the network device, a bit rate requirement based on the client device characteristics indicated in the request, wherein the client device characteristics include processor speed, memory capability, graphics capability, audio capability, and display resolution;
   choosing, for the transmission of the media content by the network device to the client device, a variable bit rate encoded content segment among the variable bit rate encoded content segments in a first media directory associated with one of the identified two or more download speeds based on the determined bit rate requirement; and
   streaming, by the network device via the communication link, the chosen variable bit rate encoded content segment from the network device to the client device.

2. The computer-implemented method of claim 1, wherein the client device includes one of a tablet computer or a smart phone.

3. The computer-implemented method of claim 1, further comprising:
   determining the resolution and time aliasing requirements further based on a velocity of motion occurring in each frame.

4. The computer-implemented method of claim 1, wherein the media content includes a video content item or an audio content item.

5. The computer-implemented method of claim 1, wherein the media content includes a live broadcast.

6. The computer-implemented method of claim 1, wherein each of the variable bit rate encoded content segments in the first media directory is encoded with a bit rate that exceeds the determined bit rate requirement.

7. A device comprising:
   a processor to:
      determine resolution and time aliasing requirements for each content segment of a media content based on an amount of media detail occurring in each frame of a set of frames in the content segment and an amount of change occurring in the media detail from one frame to another, and
      apply, based on the resolution and time aliasing requirements, a variable bit rate encoding scheme to the media content at a number of variable bit rates to generate sets of data streams comprised of variable bit rate encoded content segments;
   a network interface to receive a request for transmission of the media content to a client device over a communication link via a network, wherein the request indicates client device characteristics associated with the client device; and a storage device to store each data stream set in a media directory corresponding to a potential download speed from a plurality of different potential download speeds; and wherein the processor is further configured to:
  determine a bandwidth of the communication link;
  identify two or more download speeds, from among the different potential download speeds, based on the determined bandwidth;
  determine a bit rate requirement for the client device based on the client device characteristics indicated in the request, wherein the client device characteristics include processor speed, memory capability, graphics capability, audio capability, and display resolution;
  select, for the transmission of the media content by the device to the client device based on the bit rate requirement for the client device, a variable bit rate encoded content segment among the variable bit rate encoded content segments in a first media directory corresponding to one of the identified two or more download speeds; and
  stream, via the network interface, the selected variable bit rate encoded content segment from the device to the client device over the communication link.

8. The device of claim 7, wherein the client device includes one of a tablet computer or a smart phone.

9. The device of claim 7, wherein each of the variable bit rates correspond to:
  a spatial or temporal resolution of the variable bit rate encoded content segments.

10. The device of claim 9, wherein the spatial resolution corresponds to a display resolution of the variable bit rate encoded media content segment.

11. The device of claim 7, wherein each of the variable bit rates is a bit rate at which the bit rate encoded media content is played at the client device without a user perceiving a loss in quality.

12. A device comprising:
  a processor to:
    determine resolution and time aliasing requirements for each content segment of a media content based on an amount of media detail occurring in each frame of a set of frames in the content segment and an amount of change occurring in the media detail from one frame to another, and
    apply, based on the resolution and time aliasing requirements, a constant bit rate encoding scheme to the media content at a number of constant bit rates to generate sets of data streams comprised of constant bit rate encoded content segments;
  a network interface to receive a transmission request from a client device for the media content over a communication link via a network, wherein the transmission request includes a bit rate request and indicates client device characteristics associated with the client device;
  a storage device to store each data stream set in a media directory corresponding to a potential download speed from a plurality of different potential download speeds; and wherein the processor is further configured to:
  determine a bandwidth of the communication link;
  identify two or more download speeds, from among the different potential download speeds, based on the determined bandwidth and a required bit rate indicated in a content map associated with each of the media directories;
  determine that each of the two or more download speeds is equal to or less than the determined bandwidth;
  choose, for transmission of the media content the device to the client device based on the required bit rate and a prior download speed at which one of the constant bit rate encoded content segments was transmitted from the device to the client device, a constant bit rate encoded content segment among the constant bit rate encoded content segments in a first media directory corresponding to one of the identified two or more download speeds; and
  stream, via the network interface, the chosen constant bit rate encoded content segment from the device to the client device over the communication link.

13. The device of claim 12, wherein the client device includes one of:
  a laptop computer; a personal computer; a gaming console; or a set-top box.

14. The device of claim 12, wherein the processor is further configured to:
  generate the content map based on quality requirements to play each of the constant bit rate encoded content segments.

15. The device of claim 14, wherein the quality requirements include:
  a temporal resolution or a display resolution.

16. The device of claim 12, wherein the media content includes a video content item or an audio content item.

17. The device of claim 12, wherein the media content includes a live broadcast.

18. The computer-implemented method of claim 1, wherein the resolution requirements include a temporal resolution and a display resolution.

19. The device of claim 7, wherein the processor is further to determine the resolution and time aliasing requirements based on a velocity of motion occurring in each frame.

20. The device of claim 12, wherein the processor is further to determine the resolution and time aliasing requirements based on a velocity of motion occurring in each frame.

* * * * *